(12) United States Patent
Takao et al.

(10) Patent No.: US 7,502,596 B2
(45) Date of Patent: Mar. 10, 2009

(54) MOBILE COMMUNICATION SYSTEMS

(75) Inventors: Toshiaki Takao, Yokohama (JP);
Narumi Umeda, Yokohama (JP); Lan Chen, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 689 days.

(21) Appl. No.: 10/143,927

(22) Filed: May 14, 2002

(65) Prior Publication Data

US 2002/0173277 A1 Nov. 21, 2002

(30) Foreign Application Priority Data

May 16, 2001 (JP) .............................. 2001-146852

(51) Int. Cl.
*H04B 1/44* (2006.01)
*H04Q 7/22* (2006.01)
*H04B 17/00* (2006.01)

(52) U.S. Cl. ...................... 455/78; 455/450; 455/451; 455/67.11; 455/62; 455/63.3; 370/330; 370/294; 370/295; 370/280; 370/281

(58) Field of Classification Search ......... 455/450–453, 455/78, 62, 63.3, 67.11, 552.1, 553.1, 552–3, 455/552.3; 370/330, 294, 295, 280, 281
See application file for complete search history.

(56) References Cited

U.S. PATENT DOCUMENTS 5,794,120 A * 8/1998 Cutler et al. ............... 455/13.1
5,881,369 A * 3/1999 Dean et al. .................... 455/78
5,920,819 A * 7/1999 Asanuma .................... 455/447
5,926,466 A * 7/1999 Ishida et al. ................ 370/280
6,016,311 A * 1/2000 Gilbert et al. ............ 455/452.2

(Continued)

FOREIGN PATENT DOCUMENTS

DE 199 01 755 8/2000

(Continued)

OTHER PUBLICATIONS

H. Haas, et al., IEEE Colloqium on UMTS Terminals and Software Radio, pp. 7/1-7/6, XP-002124448, "A Capacity Investigation on UTRA-TFF Utilising Underused UTRA-FDD Uplink Resources", Apr. 26, 1999.

(Continued)

*Primary Examiner*—Matthew D Anderson
*Assistant Examiner*—Wen W Huang
(74) *Attorney, Agent, or Firm*—Oblon, Spivak, McClelland, Maier & Neustadt, P.C.

(57) ABSTRACT

A mobile communication system includes a base station connected to a backbone network, and a mobile station configured to communicate with the base station using a radio frequency. The system has a first communication mode, in which a first radio frequency is used for an uplink and a second radio frequency is used for a downlink; a second communication mode, in which the first radio frequency is used for the uplink, and the second radio frequency is shared by the uplink and the downlink; a third communication mode, in which the second radio frequency is used for the downlink, and the first radio frequency is shared by the uplink and the downlink; and a mode switcher configured to switch the first through third communication modes in accordance with data transfer volumes on the uplink and the downlink.

9 Claims, 17 Drawing Sheets

U.S. PATENT DOCUMENTS

| | | | |
|---|---|---|---|
| 6,130,897 A * | 10/2000 | Ishida et al. | 370/478 |
| 6,434,122 B2 * | 8/2002 | Barabash et al. | 455/76 |
| 6,535,748 B1 * | 3/2003 | Vuorio et al. | 455/552.1 |
| 6,553,078 B1 * | 4/2003 | Åkerberg | 375/267 |
| 6,587,444 B1 * | 7/2003 | Lenzo et al. | 370/330 |
| 6,804,214 B1 * | 10/2004 | Lundh et al. | 370/335 |
| 6,839,333 B1 * | 1/2005 | Åkerberg | 455/443 |
| 6,956,836 B2 * | 10/2005 | Chen et al. | 370/330 |
| 7,020,071 B2 * | 3/2006 | Mujtaba | 370/208 |
| 7,149,527 B2 * | 12/2006 | Chen et al. | 455/452.1 |
| 7,177,598 B2 * | 2/2007 | Klein et al. | 455/63.1 |
| 2002/0099844 A1 * | 7/2002 | Baumann et al. | 709/232 |
| 2002/0118666 A1 * | 8/2002 | Stanwood et al. | 370/345 |
| 2004/0214582 A1 * | 10/2004 | Lan et al. | 455/452.2 |

FOREIGN PATENT DOCUMENTS

| | | |
|---|---|---|
| WO | WO 97/44914 | 11/1997 |
| WO | WO 00/07399 | 2/2000 |
| WO | WO 00/42800 | 7/2000 |
| WO | WO 01/10159 | 2/2001 |

OTHER PUBLICATIONS

G. J. R. Povey, et al., Spread Spectrum Techniques and Applications, 1998. Proceedings., 1998 IEEE 5th International Symposium, pp. 630-633, XP-010307626, "A Review of Time Division Duplex-CDMA Techniques", Sep. 2, 1998.

* cited by examiner

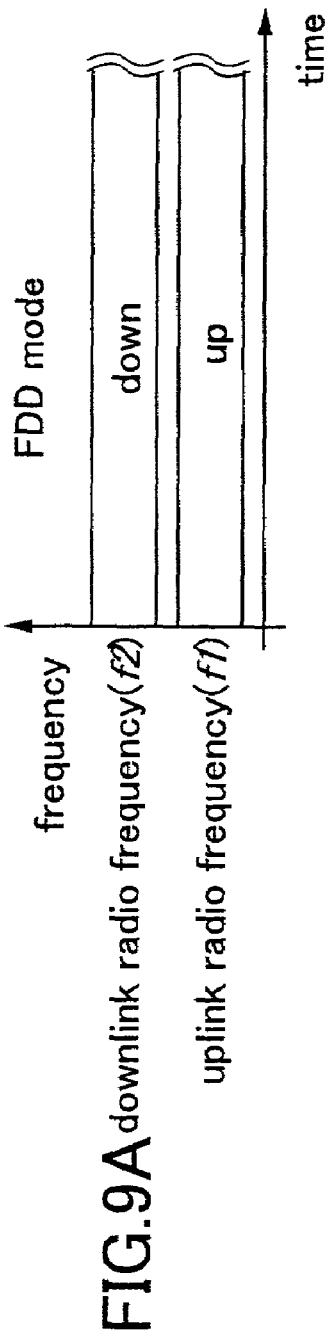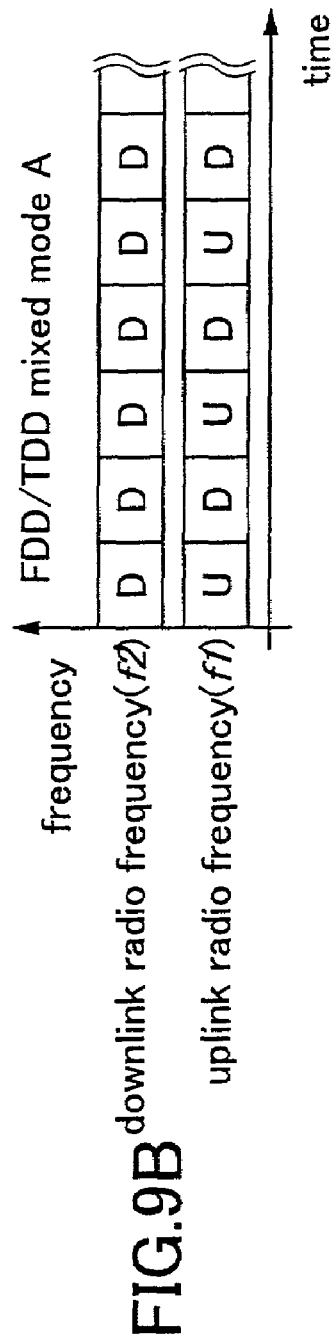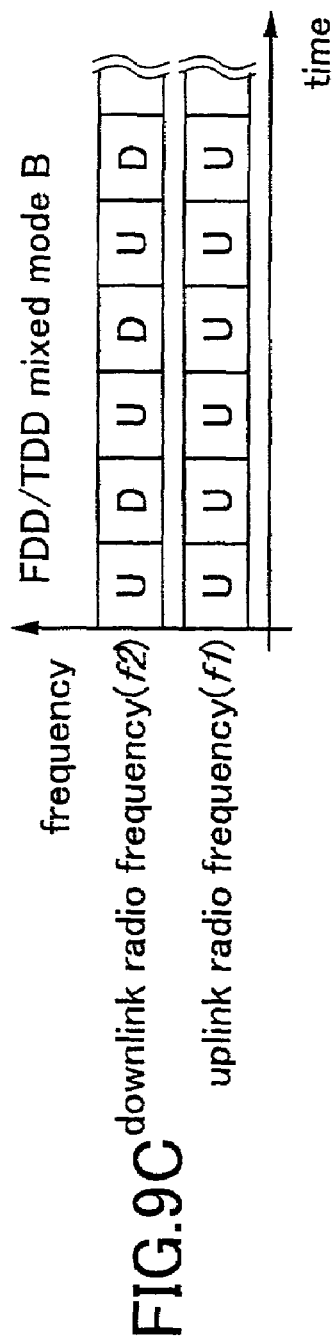

FIG.11A

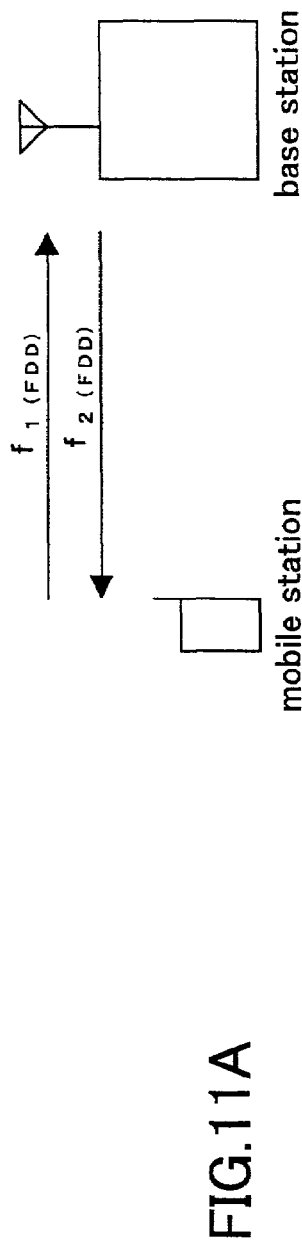

FIG.11B

| FDD mode | | | |
|---|---|---|---|
| mobile station | SW1 | switch to transmitter A | |
| | SW2 | switch to receiver B | |
| | S/P | no S/P conversion, all the signals from SPU to transmitter A | |
| | P/S | no P/S conversion, all the signals from receiver B to SPU | |
| base station | SW1 | switch to receiver A | |
| | SW2 | switch to transmitter B | |
| | S/P | no S/P conversion, all the signals from SPU to transmitter B | |
| | P/S | no P/S conversion, all the signals from receiver A to SPU | |

FDD/TDD mixed mode A

| | | | |
|---|---|---|---|
| mobile station | SW1 | | switch alternately |
| | SW2 | | switch to receiver B |
| | S/P | | no S/P conversion, all the signals from SPU to transmitter A |
| | P/S | | P/S conversion at a ratio of 1:2 between receiver A:B, |
| base station | SW1 | | switch alternately |
| | SW2 | | connect to transmitter B |
| | S/P | | S/P conversion at a ratio of 1:2 between transmitter A:B |
| | P/S | | no P/S conversion, all the signals from receiver A to SPU |

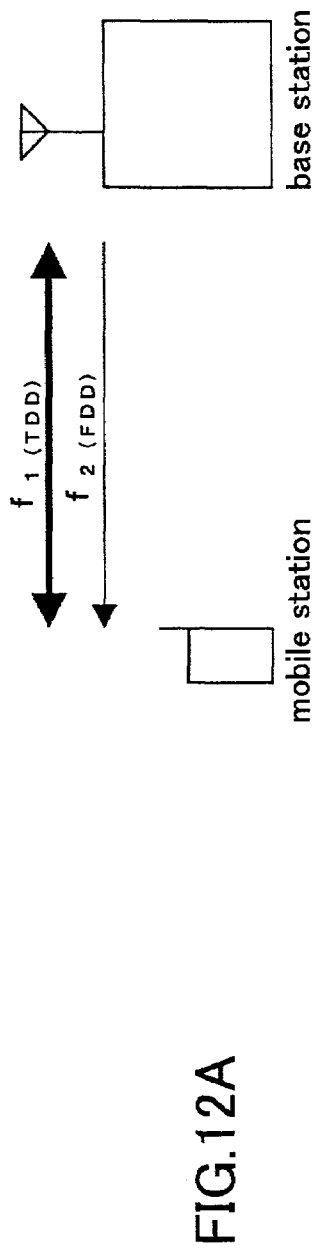

FIG.13A

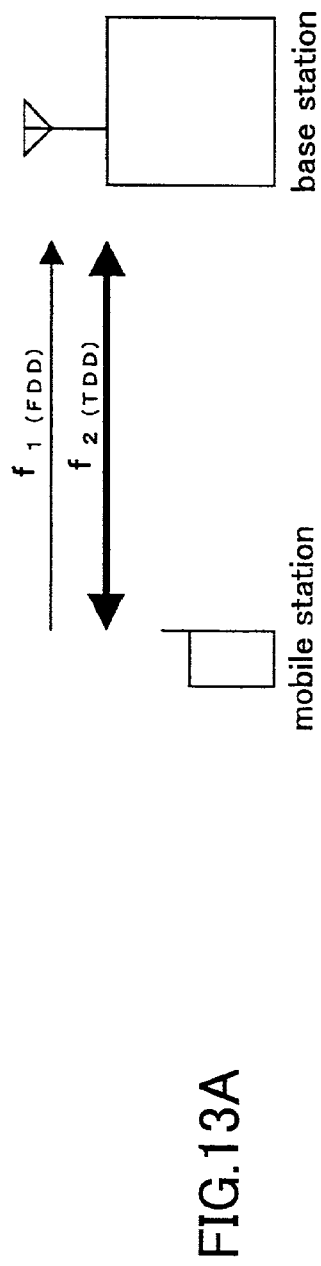

FIG.13B

FDD/TDD mixed mode B

| | | | |
|---|---|---|---|
| mobile station | SW1 | switch to transmitter A |
| | SW2 | switch alternately |
| | S/P | S/P conversion at a ratio of 2:1 between transmitter A:B |
| | P/S | no P/S conversion, all the signal from receiver B to SPU |
| base station | SW1 | switch to receiver A |
| | SW2 | switch alternately |
| | S/P | no S/P conversion, all the signals from SPU to transmitter B |
| | P/S | P/S conversion at a ratio of 2:1 between receiver A:B |

MOBILE COMMUNICATION SYSTEMS

BACKGROUND OF THE INVENTION

1. Field of the Invention

The present invention generally relates to a mobile communication system, and more particularly, to a mobile communication system that is capable of switching the duplex modes of an uplink or downlink depending on the transmission volume communicated between a base station and a mobile station.

2. Description of the Related Art

Duplexing carried out in the current mobile communication system is generally classified into frequency division duplex (FDD) and time division duplex (TDD).

FIG. 1 illustrates a conventional cell structure in FDD communication, and FIG. 2 illustrates the basic concept of conventional FDD communication. As shown in FIG. 1, base stations $11_1$, $11_2$, and $11_3$ are located in the respective cells 400, 500, and 600, and connected to mobile stations $21_1$, $21_2$, and $21_3$, respectively, via radio channels. In FDD, different frequencies $f_1$ and $f_2$ are allocated to the uplink, which is directed from the mobile station to the base station, and the downlink, which is directed from the base station to the mobile station. The radio frequencies $f_1$ and $f_2$ occupy the associated links all the time, as shown in FIG. 2. In addition, the radio frequencies $f_1$ and $f_2$ are used equally in all the cells 400, 500, and 600.

FIG. 3 illustrates a conventional FDD mobile communication system. This FDD system includes a base station $11_1$ and a mobile station $21_1$. The base station $11_1$ has a signal processing unit 80 connected to the backbone network (e.g., mobile communication network), a transmitter 81, a receiver 82, a band pass filter (BPF) 83 with a center frequency of $f_1$, a band pass filter (BPF) 84 with a center frequency of $f_2$, and antennas 85, 86 connected to the receiver 82 and the transmitter 81, respectively.

The mobile station $21_1$ has an input unit 70 (e.g., microphone 70a or keyboard 70b), an output unit 71 (e.g., display 71a or speaker 71b), a signal processing unit 72, a transmitter 73, a receiver 74, a band pass filter (BPF) 75 with a center frequency of $f_1$, a band pass filter (BPF) 76 with a center frequency of $f_2$, and antennas 77, 78 connected to the transmitter 73 and the receiver 74, respectively.

In operation of the mobile station $21_1$, digital signals supplied from the input unit 70 are converted to baseband signals by the signal processing unit 72. The baseband signals are converted to radio signals by the transmitter 73, which then pass through the band pass filter 75. Radio signal components of center frequency $f_1$ are extracted by the band pass filter 75, and the signals are transmitted from the antenna 77 to the base station 1 at a frequency $f_1$.

The radio signals transmitted from the mobile station $21_1$ are received by the antenna 85 of the base station $11_1$, and supplied to the receiver 82 via the band pass filter 83. The received radio signals are converted to baseband signals, and the baseband signals are then converted to digital signals by the signal processing unit 80. The digital signals are transmitted to the backbone network, such as a mobile communication network.

On the other hand, in the downlink, digital signals received by the base station $11_1$ from the backbone network are converted to baseband signals by the signal processing unit 80, and then converted to radio signals by the transmitter 81. The band pass filter 84 extracts only those signal components with a center frequency of $f_2$, which are then transmitted to the mobile station $21_1$.

The radio signals transmitted from the base station $11_1$ are received by the antenna 78 of the mobile station $21_1$, and supplied to the receiver 74 via the band pass filter 76. The radio signals are converted into digital signals through the receiver 74 and the signal processing unit 72, and supplied to the output unit 71.

In FDD, radio communication is carried out by allocating different frequencies $f_1$ and $f_2$ to the uplink (from the mobile station $21_1$ to the base station $11_1$) and the downlink (from the base station $11_1$ to the mobile station $21_1$.

FIGS. 4-7 illustrate the concept of conventional TDD communication. In conventional TDD, the same radio frequency is used on the uplink and the downlink, unlike FDD. As illustrated in FIG. 4, base stations $12_1$-$12_{14}$ are located in the respective cells 700-713. In this cell structure, a mobile station $22_1$, which is under management of the base station $12_1$, is connected to a mobile station $22_2$, which is under management of the base station $12_2$ by means of TDD communication. In TDD, three or more frequencies ($f_1$-$f_3$) are allocated alternately and repeatedly to the cells (#1-#3). This arrangement is required to guarantee a sufficient spatial distance between those cells that use the same radio frequency in order to preclude interference from the neighborhood cells. Each frequency allocated to one of the cells #1-#3 is used for the uplink and the downlink alternately each at an equal time interval. The time period allocated to the alternate links is called a time slot.

FIG. 6 illustrates a conventional TDD mobile communication system. This TDD system includes a base station $12_1$ and a mobile station $22_1$. The base station $12_1$ has a signal processing unit 120 connected to the backbone network (e.g., mobile communication network), a transmitter 122, a receiver 123, a switch (SW) 124, a band pass filter (BPF) 125 with a center frequency of $f_1$, and an antenna 126 for transmitting and receiving radio signals.

The mobile station $22_1$ has an input unit 110, such as a microphone 110a or a keyboard 110b, an output unit 111, such as a display 111a or a speaker 111b, a signal processing unit 112, a transmitter 114, a receiver 115, a switch (SW) 116, a band pass filter (BPF) 117 with a center frequency of $f_1$, and an antenna 118 for transmitting and receiving radio signals.

In operation of the mobile station $22_1$ in the TDD system, digital signals supplied from the input unit 110 are converted to baseband signals by the signal processing unit 112. The baseband signals are converted to radio signals by the transmitter 114, which then pass through the switch (SW) 116 and the band pass filter (BPF) 117. Radio signal components of center frequency of flare extracted, and are transmitted from the antenna 118 to the base station $12_1$ at a frequency $f_1$.

The radio signals transmitted from the mobile station $22_1$ are received by the antenna 126 of the base station $12_1$, and supplied to the receiver 123 via the band pass filter (BPF) 125 and the switch (SW) 124. The received radio signals are converted to digital signals by the receiver 123 and the signal processing unit 120. The digital signals are then transmitted to the backbone network.

On the other hand, in the downlink, digital signals received at the base station $12_1$ from the backbone network are converted to radio signals by the signal processing unit 120 and the transmitter 122. The radio signals pass through the switch (SW) 124 and the band pass filter (BPF) 125, in which only those signal components with a center frequency of $f_1$ are extracted. The radio signals of frequency $f_1$ are transmitted from the antenna 126 to the mobile station 221.

The radio signals transmitted from the base station $12_1$ are received by the antenna 118 of the mobile station $22_1$, supplied to the receiver 115 via the band pass filter (BPF) 117 and the switch (SW) 116. The radio signals are converted into digital signals through the receiver 115 and the signal processing unit 112, and supplied to the output unit 111.

The switching controllers 121 and 113 of the base station $12_1$ and the mobile station $22_1$ respectively, superpose control signals on the downlink communication signals so that the base station $12_1$ and the mobile station $22_1$ synchronize with each other. The switching controllers 121 and 113 switch the switches (SWs) 124 and 116, respectively, based on the control signal supplied from the signal processing unit 120 of the base station.

With this arrangement, during uplink communication, the signal processing unit 120 of the base station $12_1$ stops supplying signals to the transmitter 122. Accordingly, the transmitter 122 of the base station $12_1$ and the receiver 115 of the mobile station $22_1$ suspend operations. On the other hand, during the downlink communication, the signal processing unit 112 of the mobile station $22_1$ stops supplying signals to the transmitter 114. Accordingly, the transmitter 114 of the mobile station $22_1$ and the receiver 123 of the mobile station $12_1$ suspend operations.

In recent years, the volume of data transmitted in mobile radio communication has increased greatly. Unlike voice communication on telephone lines, data communication is likely to produce asymmetric situations in the volume of data between the uplink and the downlink. In particular, as browser phones, which are cellular phones allowing the users to access homepages uploaded in servers on the Internet or use electronic mail, have rapidly spread, digital contents is frequently downloaded from the servers set by providers. As a result, the data amount transmitted on the downlink is likely to be larger than that on the uplink.

In the conventional duplex method (either FDD or TDD), even if the data amount on the downlink is much larger than that on the uplink because of asymmetric transmission volume, an equal radio frequency or a time slot has to be allocated to the uplink and the downlink. For this reason, the radio resources, such as a time slot or a frequency band, are wasted. Besides, since the radio frequency band allocated to mobile radio communication is limited, the transmission capacity of the system is also restricted.

Accordingly, it is an important requirement to eliminate waste of radio resources so as to maximize deterioration of the transmission capacity of the system in the limited radio frequency band. From this viewpoint, the $3^{rd}$ Generation Partnership Project (3GPP), which is an organization that investigates technological standards of IMT-2000, has proposed asymmetric duplex as illustrated in FIG. 7.

In this method, a series of frames (F#1, F#2, ... F#n), each consisting of a plurality of time slots (for example, four in the example of FIG. 7), are provided. The numbers of time slots allocated to the uplink and the downlink are set asymmetric in order to cope with asymmetric data volume on the uplink and the downlink.

However, this asymmetric duplexing is unsuitable to a large-capacity mobile communication system because data are transmitted in the same radio frequency band in both the uplink and the downlink, and therefore, a continuing wide range of frequency bands must be guaranteed. Unfortunately, the allocated radio frequency bands are overcrowded, and it is difficult to obtain a continuing wide range of frequency bands.

Another problem arises if TDD is applied to WCDMA systems, and if the data volumes in the uplink and the downlink become asymmetric. In asymmetric TDD-type ACDMA, as the volume of the communication data increases, high-speed processing is required in generating clock frequencies for the baseband signal and modulating the baseband signal to a radio signal. This causes the structures of both the mobile terminal and the base station to be complicated.

SUMMARY OF THE INVENTION

Therefore, it is an object of the present invention to provide a mobile communication system that can realize an efficient use of the radio frequency resources without complicating the structure, even if the data volume is asymmetric in parallel transmissions on the uplink and the downlink.

To achieve the object, in one aspect of the invention, a mobile communication system includes a base station, and a mobile station configured to communicate with the base station using a radio frequency. This mobile communication system has a first communication mode, a second communication mode, a third communication mode, and a mode switcher that switches the first through third communication mode in accordance with data transfer volumes on the uplink and the downlink. In the first communication mode, a first radio frequency is used for an uplink and a second radio frequency is used for a downlink. In the second communication mode, the first radio frequency is used for the uplink, and the second radio frequency is shared by the uplink and the downlink. In the third communication mode, the second radio frequency is used for the downlink, and the first radio frequency is shared by the uplink and the downlink.

If the communication volumes on the uplink (from the mobile station to the base station) and the downlink (from the base station to the mobile station) are symmetric, the first mode is selected. If the communication volumes on the uplink and the downlink become asymmetric, the mode is switched to the second or the third communication mode, in which either the first or second radio frequency is used for bidirectional communication (e.g., for both the uplink and the downlink) in a duplex manner. With this mobile communication system, radio resources required for radio communication is allocated efficiently to both symmetric and asymmetric communication.

In another aspect of the invention, a mobile communication system that can easily cope with increase of the data transfer volume on the uplink is provided. This mobile communication system includes a base station and a mobile station configured to communicate with the base station, and it has a first communication mode, a second communication mode, and a mode switcher that switches the first and second communication modes in accordance with data transfer volumes on the uplink and the downlink. In the first communication mode, a first radio frequency is used for an uplink and a second radio frequency is used for a downlink. In the second communication mode, the first radio frequency is used for the uplink, and the second radio frequency is shared by the uplink and the downlink.

If the data transfer volume on the uplink increases, the communication mode is switched to the second mode, in which the up channel communication and the down channel communication are switched in a duplex manner at the same second frequency. Since the mode switching causes the downlink frequency (e.g., the second frequency) to be used in a duplex manner, the mode control operation is simplified, without causing the structures of the base station and the mobile station to be complicated.

In still another aspect of the invention, a mobile communication system that can easily cope with increase of the data transfer volume on the downlink is provided. This mobile communication system includes a base station and a mobile station configured to communicate with the base station using a radio frequency, and it has a first communication mode, in which a first radio frequency is used for an uplink and a second radio frequency is used for a downlink, and a second communication mode, in which the second radio frequency is used for the downlink and the first radio frequency is shared by the uplink and the downlink. The system also has a mode switcher configured to switch the first and second communication modes in accordance with data transfer volumes on the uplink and the downlink.

In yet another aspect of the invention, a base station configured to communicate with a mobile terminal in a prescribed geographical is provided. The base station communicates with the mobile terminal using at least two of a first communication mode in which a first radio frequency is used for an uplink and a second radio frequency is used for a downlink; a second communication mode in which the first radio frequency is used for the uplink, and the second radio frequency is shared by the uplink and the downlink; and a third communication mode in which the first radio frequency is shared by the uplink and the downlink and the second radio frequency is used for the downlink. The base station comprises a signal processing unit configured to produce a control signal for designating one of the communication modes, and a switching controller configured to receive the control signal and change the communication mode based on the control signal.

BRIEF DESCRIPTION OF THE DRAWINGS

Other objects, features, and advantages of the invention will become more apparent from the following detailed description when read in conjunction with the accompanying drawings, in which

FIGS. 9A-9C illustrate three types of communication modes used in the mobile communication system according to an embodiment of the invention;

FIG. 11 illustrates the operation of the mobile communication system in the FDD mode, in which the data volumes on the downlink and the uplink are almost equal;

FIG. 12 illustrates the operation of the mobile communication system in the FDD/TDD mixed mode A, in which the data volume on the downlink is greater than that on the uplink;

FIG. 13 illustrates the operation of the mobile communication system in the FDD/TDD mixed mode B, in which the data volume on the uplink is greater than that on the downlink.

DETAILED DESCRIPTION OF THE PREFERRED EMBODIMENTS

The details of the preferred embodiment of the invention will now be described with reference to the attached drawings.

Figure 1:
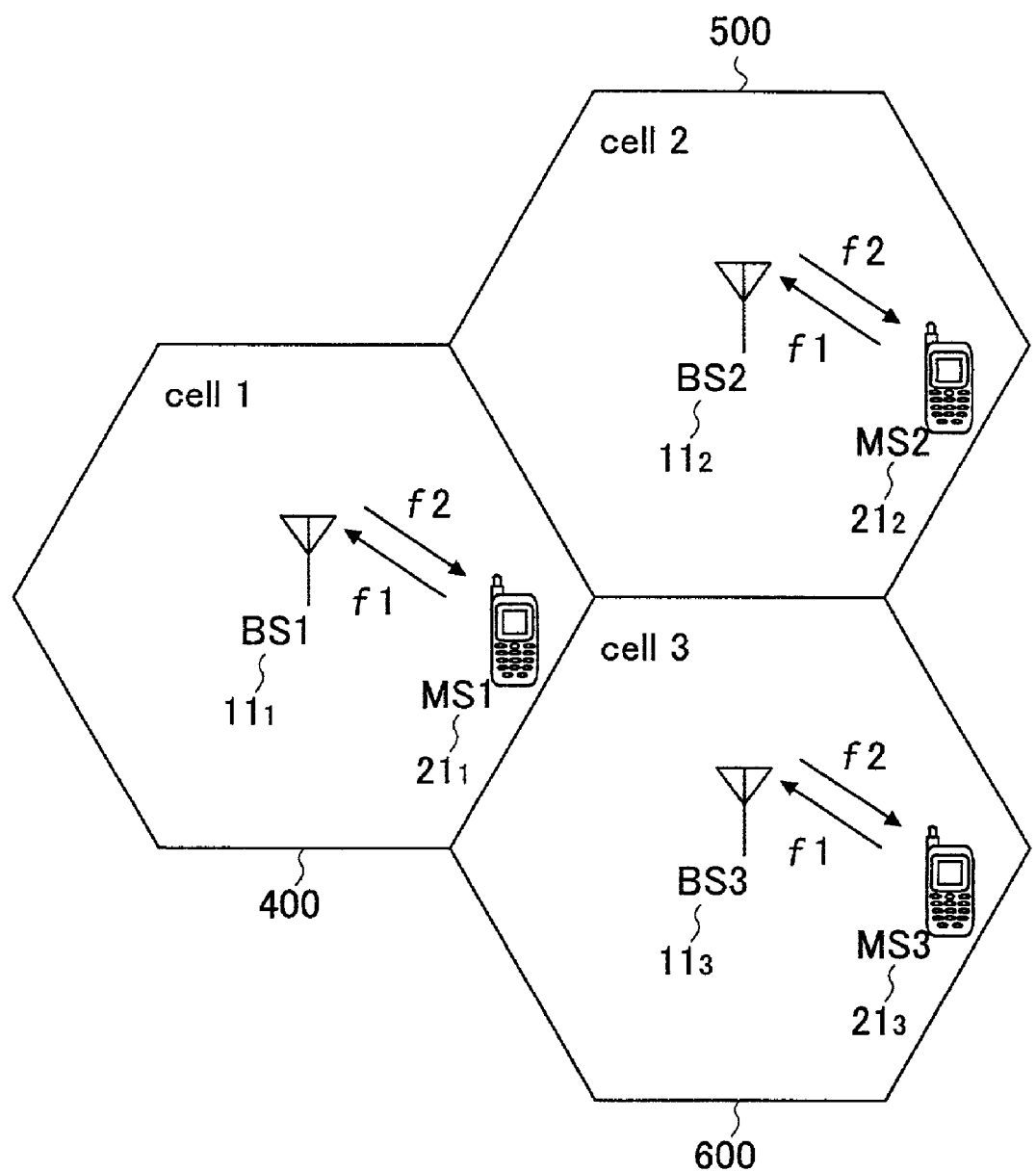
FIG. 1 illustrates a cell structure of the conventional FDD system.
Figure 2:
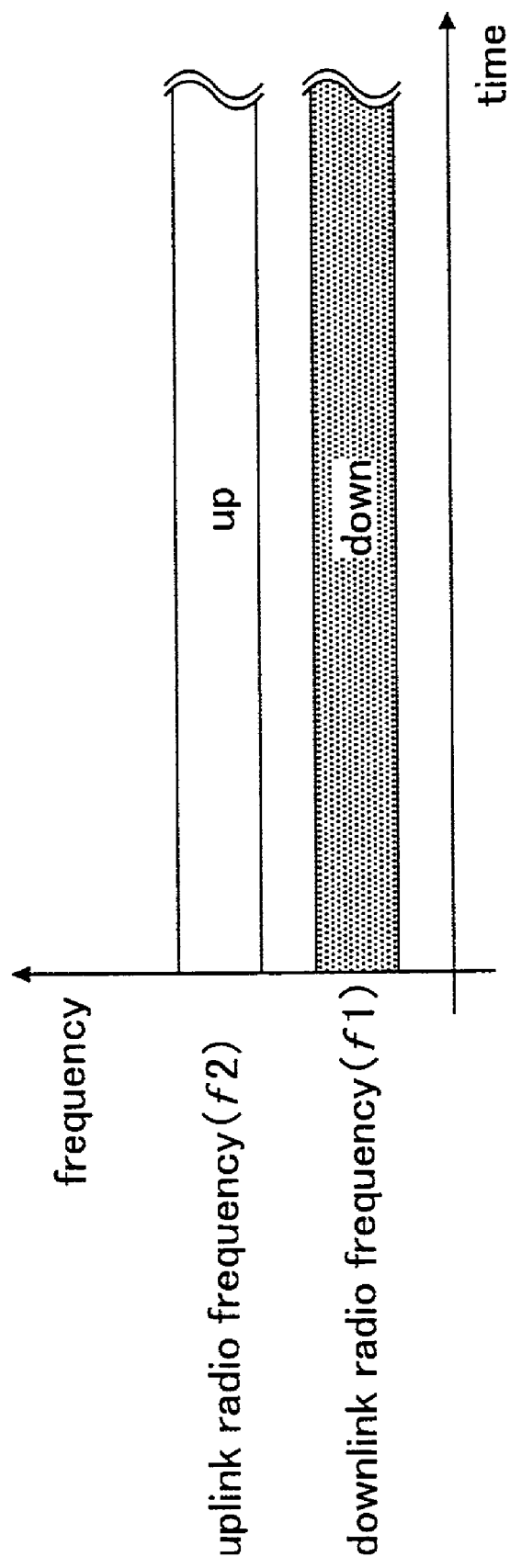
FIG. 2 illustrates the concept of conventional FDD.
Figure 3:
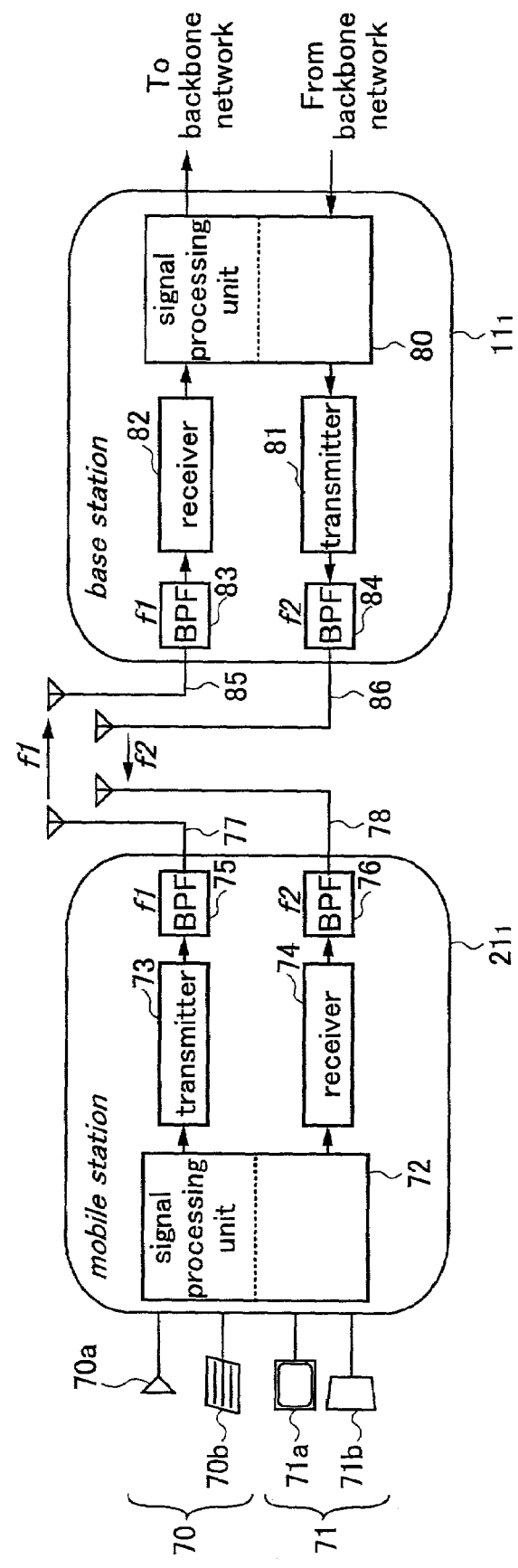
FIG. 3 illustrates the structure of a conventional FDD mobile communication system.
Figure 4:
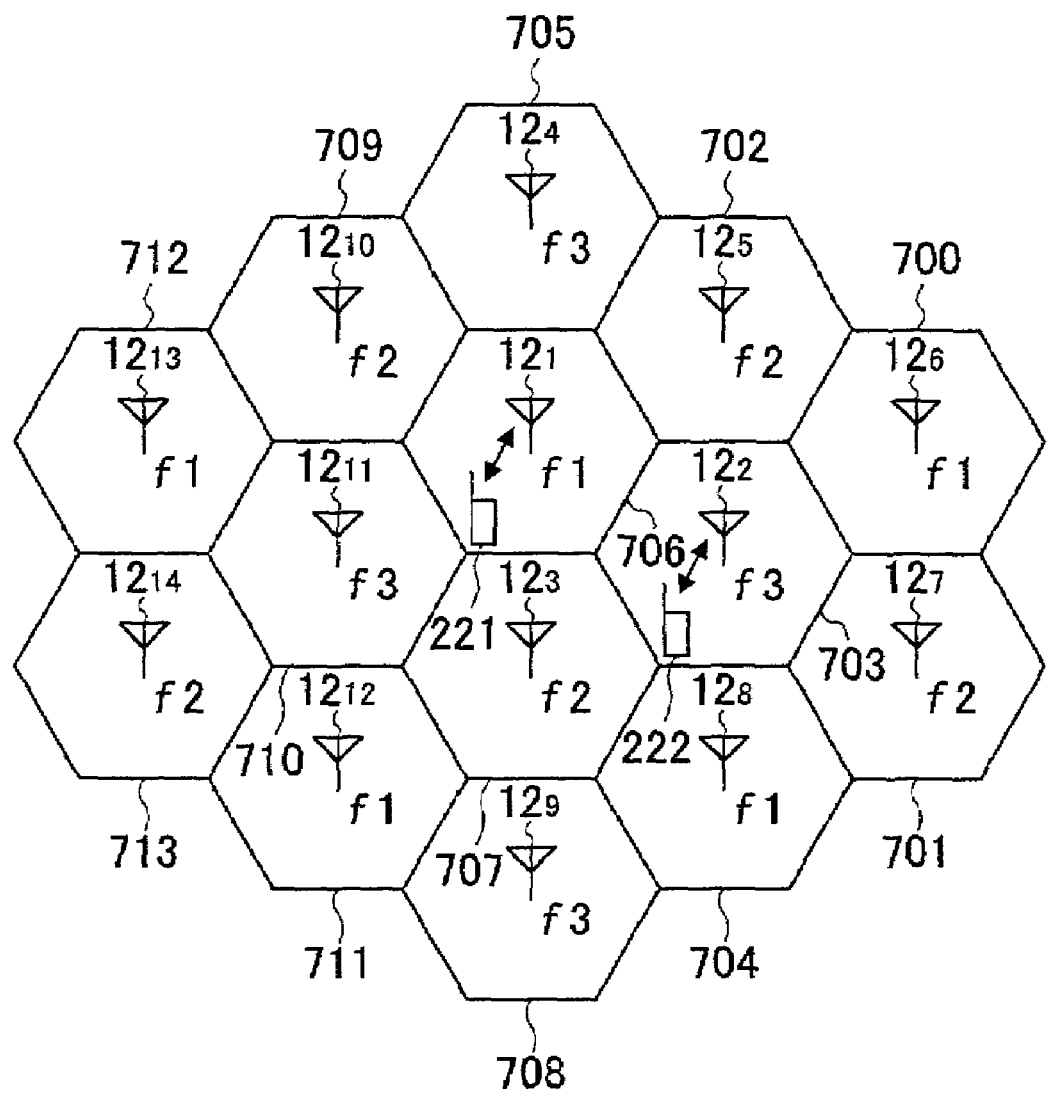
FIG. 4 illustrates a cell structure of the conventional TDD system.
Figure 5:
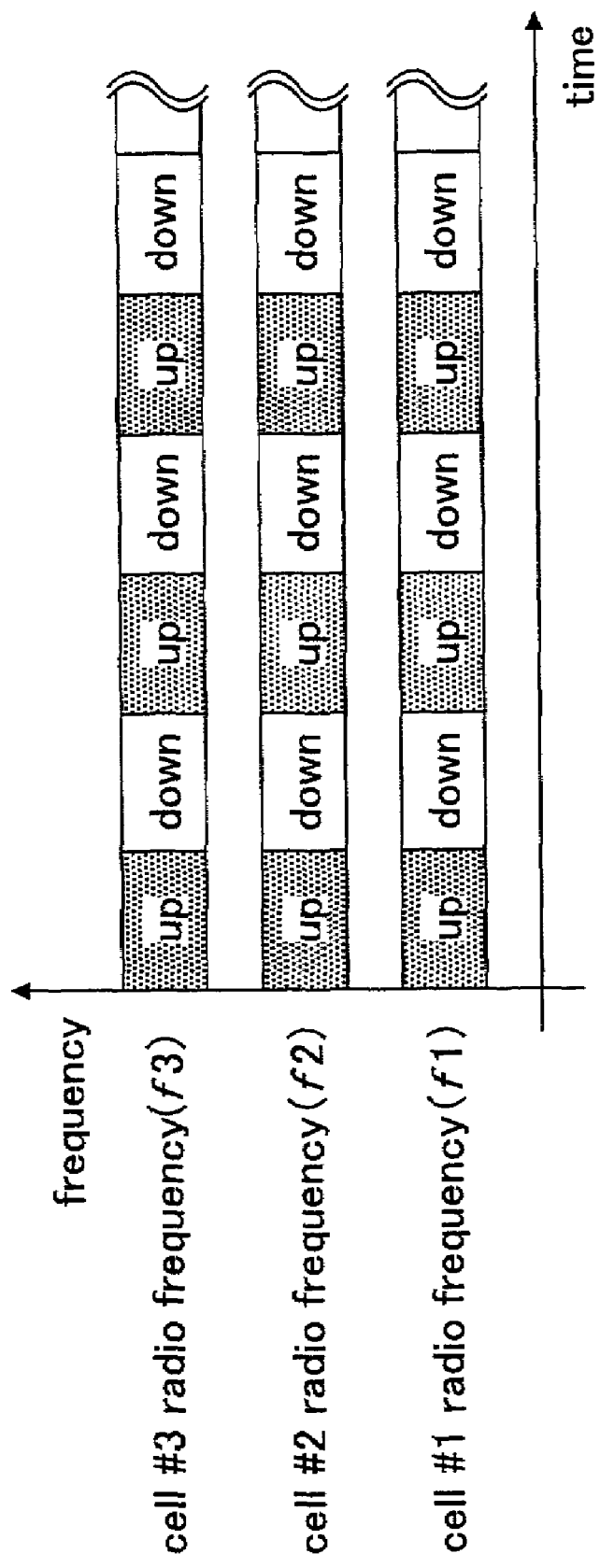
FIG. 5 illustrates the concept of conventional TDD.
Figure 6:
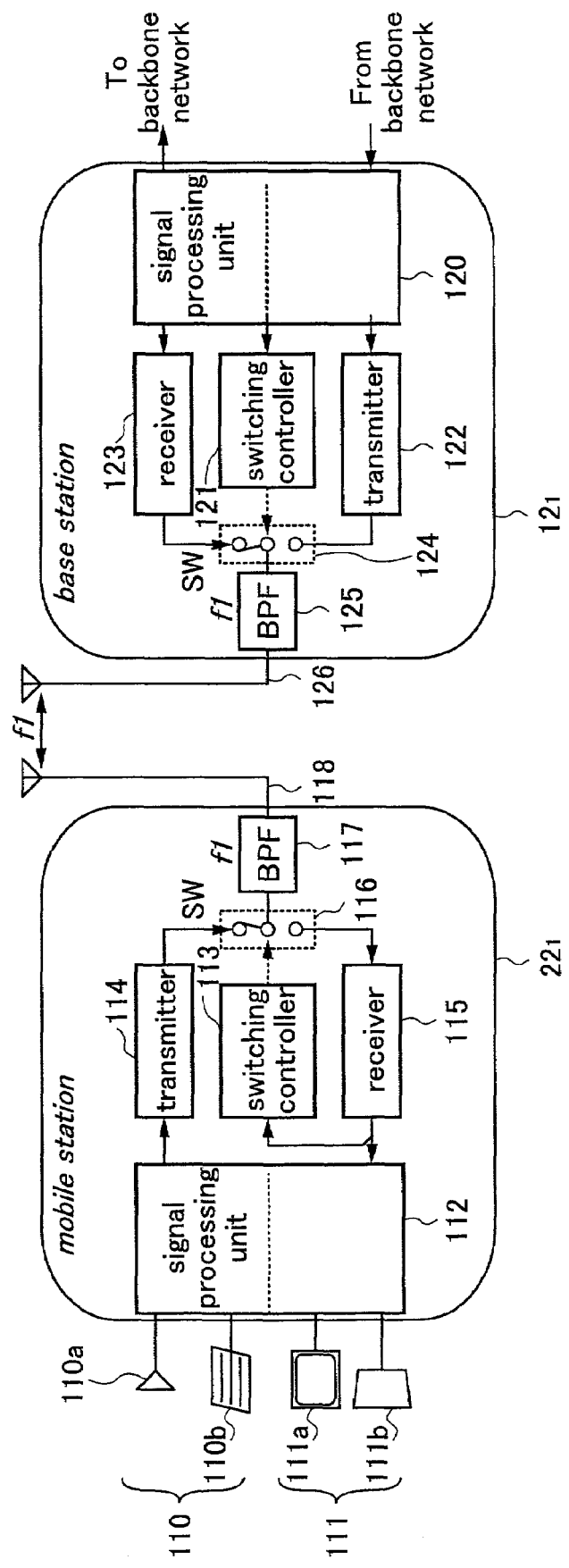
FIG. 6 illustrates the structure of a conventional TDD mobile communication system.
Figure 7:
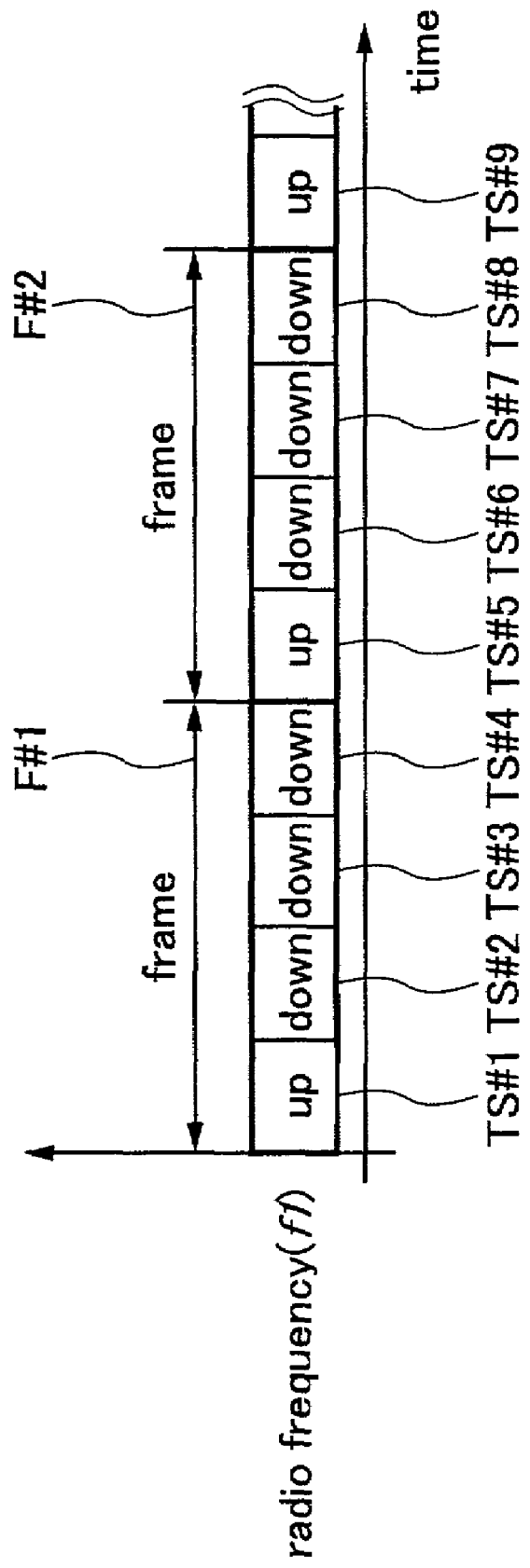
FIG. 7 further illustrates the concept of conventional TDD communication.
Figure 8:
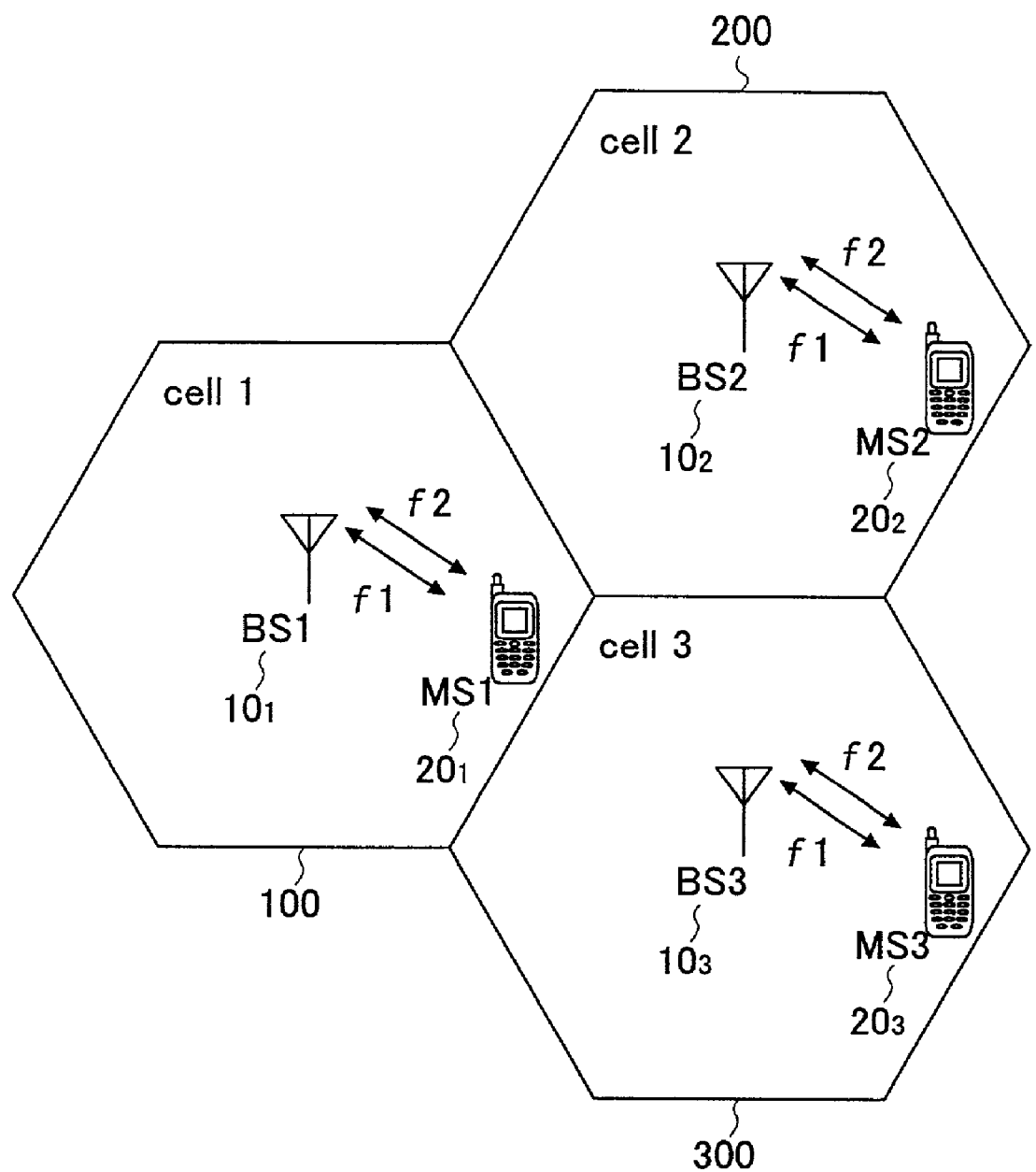
FIG. 8 illustrates an example of the cell structure of a mobile communication system according to an embodiment of the present invention.

FIG. 8 illustrates an example of the cell structure of the mobile communication system according to an embodiment. The mobile communication system comprises base stations (BS1-BS3) $10_1$-$10_3$ positioned in cells 100, 200, 300, respectively, and mobile stations (MS1-MS3) $20_1$-$20_3$ connected to the associated base stations $10_1$-$10_3$ via radio communication to achieve voice communication, non-telephone communication, and other types of communication.

In this system, radio frequency $f_1$ is used on the uplink from the mobile stations $20_1$-$20_3$ to the base stations $10_1$-$10_3$, and radio frequency $f_2$ is used on the downlink from the base stations $10_1$-$10_3$ to the mobile stations $20_1$-$20_3$. These frequencies $f_1$ and $f_2$ are equally used in all the cells.

FIGS. 9A-9C illustrate three types of communication modes used in the mobile communication system in an embodiment. In this example, one of the three modes is selected depending on the communication volumes on the uplink and the downlink. These three modes include the FDD mode (FIG. 9A), the FDD/TDD mixed mode A (FIG. 9B), and the FDD/TDD mixed mode B (FIG. 9C)

If the data volume on the uplink (from the mobile station to the base station) is almost the same as that on the downlink (from the base station to the mobile station), the FDD mode is selected. In the FDD mode, for example, frequency $f_1$ is used exclusively for the uplink, and frequency $f_2$ is used exclusively for the downlink. This mode is similar to the conventional FDD technique.

If the data volume on the downlink becomes greater than that on the uplink, the mode is switched to the FDD/TDD mixed mode A, in which the uplink frequency $f_1$ is shared between the uplink and the downlink, while the downlink frequency $f_2$ is still used exclusively for the downlink. In other words, the downlink channel and the uplink share the uplink frequency $f_1$ in alternate time slots, as in the TDD technique. In the example shown in FIG. 9B, the time slots (intervals) for the uplink and the downlink communication are set equal, and the data capacity ratio of the uplink to the downlink becomes 1 to 3 (1:3).

If the data volume on the downlink becomes smaller than that on the uplink, the FDD/TDD mixed mode B is selected. In this mode, the uplink frequency $f_1$ is used exclusively for the uplink, and the downlink frequency $f_2$ is shared between the uplink and the downlink in alternate time slots, as in TDD. In this case, the communication ratio of the uplink to the downlink is 3 to 1 (3:1).

By switching these three modes depending on the situation, the system can deal with the asymmetric radio communication.

Figure 10:
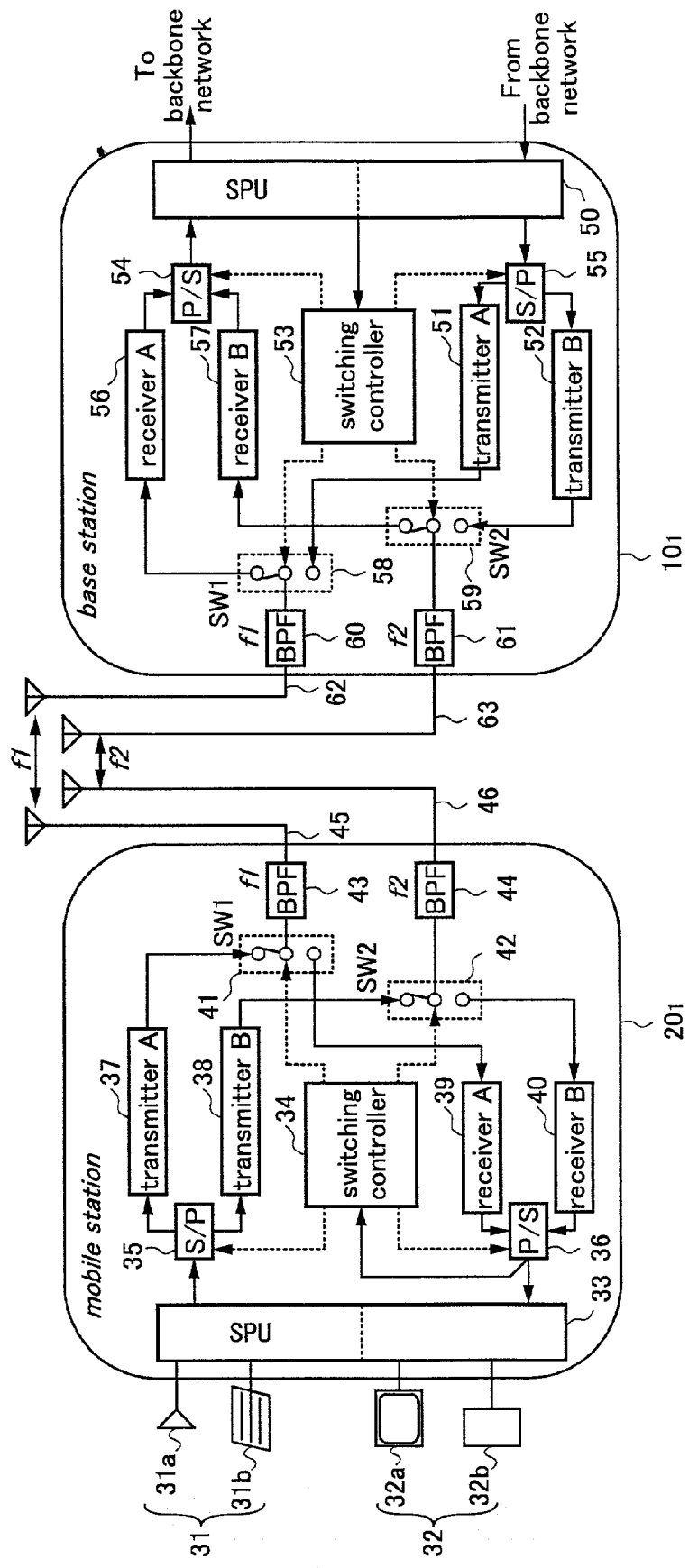
FIG. 10 illustrates the structure of the mobile communication system according to an embodiment of the invention.

FIG. 10 illustrates the mobile communication system according to an embodiment, which includes a mobile station $20_1$ and a base station $10_1$. The mobile station $20_1$ has an input unit 31, such as a microphone 31a or a keyboard 31b, an output unit 32, such as a display 32a or a speaker 32b, a signal processing unit 33, a switching controller 34, a serial to parallel converter (S/P) 35, and a parallel to serial converter (P/S) 36. The mobile station $20_1$ also has two transmitters 37 and 38, two receivers 39 and 40, two switches (SW1 and SW2) 41 and 42, a first band pass filter (BPF) 43 with a center frequency of $f_1$, a second band pass filter (BPF) 44 with a center frequency of $f_2$, and two antennas 45 and 46. Each antenna is used for both transmitting and receiving radio signals.

The base station 101 has a signal processing unit 50 connected to the backbone network (e.g., mobile communication network), two transmitters 51 and 52, a parallel to serial converter (P/S) 54, a serial to parallel converter (S/P) 55, and two receivers 56 and 57. The base station 101 also has two switches (SW1 and SW2) 58 and 59, a first band pass filter (BPF) 60 with a center frequency of $f_1$, a second band pass filter (BPF) 61 with a center frequency of $f_2$, and antennas 62, 63, each antenna used for both transmitting and receiving radio signals.

In operation, a digital signal input from the input unit 31 of the mobile station $20_1$ is converted to a baseband signal by the signal processing unit 33, and divided into two lines of baseband signals by the serial to parallel converter 35. These baseband signals are converted to radio signals by the first and second transmitters 37 and 38. The radio signals are supplied to the first and second band pass filters (BPS) 43 and 44 via the first and second switches (SW1 and SW2) 41 and 42, respectively. The first band pass filter 43 extracts the signal component of frequency $f_1$, and the second band pass filter 44 extracts the signal component of frequency $f_2$. These radio signals of frequencies $f_1$ and $f_2$ are to be transmitted to the base station $10_1$ via the antennas 45 and 46, respectively.

The radio signals transmitted from the mobile station $20_1$ at frequencies $f_1$ and $f_2$ are received by the associated antennas 62 and 63, and supplied to the first and second receivers 56 and 57, respectively, via the associated band pass filters 60 and 61, and the associated switches 58 and 59. The radio signals are converted to baseband signals by the receivers 56 and 57, and synthesized by the parallel to serial converter (P/S) 54. The composite baseband signal is converted to a digital signal by the signal processing unit 50, and transmitted to the backbone network.

On the downlink, the digital signal supplied from the backbone network is converted to a baseband signal by the signal processing unit 50. The baseband signal is divided into two lines of baseband signals by the serial to parallel converter (S/P) 55, and then converted to radio signals by the associated transmitters 51 and 52. These two radio signals pass through the associated switches (SW1 and SW2) 58 and 59, and the associated band pass filters (BPFs) 60 and 61. The first band pass filter 60 extracts only the signal component of frequency $f_1$, and the second band pass filter 61 extracts only the signal component of frequency $f_2$. These radio signals are transmitted to the mobile station $20_1$ from the associated antennas 62 and 63.

The radio signals transmitted from the base station $10_1$ at frequencies $f_1$ and $f_2$ are received by the associated antennas 45 and 46 of the mobile station $20_1$, and supplied to the receivers 39 and 40 via the associated band pass filters 43 and 44, and the switches (SW1 and SW2) 41 and 42, respectively. The radio signals are then converted to baseband signals by the receivers 39 and 40. The two lines of baseband signals are synthesized by the parallel to serial converter (P/S) 36. The composite signal is converted to a digital signal by the signal processing unit 33, and output to the output unit 32.

The switching controller 53 of the base station $10_1$ and the switching controller 34 of the mobile station $20_1$ superpose control signals on the downlink to allow the base station 101 and the mobile station $20_1$ to synchronize with each other. Under the synchronization, the switching controllers 53 and 34 switch the communication mode of the system based on the control signal supplied from the signal processing unit 50 of the base station 101. The switching controllers 53 and 34, and the signal processing unit 50 constitute a mode switcher.

In other words, based on the control signal from the signal processing unit 50, the switching controllers 53 and 34 regulate operations of the first switches (SW1) 58 and 41, the second switches (SW2) 59 and 42, the serial to parallel converters (S/P) 55 and 35, and the parallel to serial converters (P/S) 54 and 36 in three different manners illustrated in FIGS. 11-13.

With the data volume on the uplink almost the same with that on the downlink, the mobile communication system operates in the FDD mode, as illustrated in FIGS. 11A and 11B. In the FDD mode, radio frequency $f_1$ is used exclusively for the uplink, and radio frequency $f_2$ is used exclusively for the downlink, as illustrated in FIG. 11A. The control signal generated by the signal processing unit 50 of the base station $10_1$ contains commands for regulating the first switches (SW1) 58 and 41, the second switches (SW2) 59 and 42, the serial to parallel converters (S/P) 55 and 35, and the parallel to serial converters (P/S) 54 and 36, so that the mobile station $20_1$ transmits at frequency $f_1$ and receives at frequency $f_2$, and that the base station receives at frequency $f_1$ and transmits at frequency $f_2$.

To be more precise, in the mobile station $20_1$, the first switch (SW1) 41 is connected to the transmitter A (37), and the second switch (SW2) 42 is connected to the receiver B (40), as illustrated in FIG. 11B. No serial to parallel conversion is carried out by S/P converter 35, and all the signals from the signal processing unit 33 are supplied to the transmitter A (37). Similarly, no parallel to serial conversion is carried out by P/S converter 36, and all the signals received at the receiver B (40) are supplied to the signal processing unit 33.

On the other hand, in the base station $10_1$, the first switch (SW1) is connected to the receiver A (56), and the second switch (SW2) is connected to the transmitter B (52). No serial to parallel conversion is carried out by S/P converter 55, and all the signals from the signal processing unit 50 are supplied to the transmitter B (52). Similarly, no parallel to serial conversion is carried out by P/S converter 54, and all the signals received at the receiver A (56) are supplied to the signal processing unit 50.

If the data volume on the downlink becomes greater than that on the uplink, the mode is changed to the FDD/TDD mixed mode A, as illustrated in FIGS. 12A and 12B. In this mode, radio frequency $f_1$ on the uplink is shared by the up channel and the down channel in the time division duplex (TDD) manner, as illustrated in FIG. 12A. The control signal generated by the signal processing unit 50 of the base station $10_1$ contains control commands for regulating the first switches (SW1) 58 and 41, the second switches (SW2) 59 and 42, the serial to parallel converters (S/P) 55 and 35, and the parallel to serial converters (P/S) 54 and 36, so that the base station $10_1$ transmits and the mobile station $20_1$ receives at frequency $f_2$, and that the uplink frequency $f_1$ is used alternately by the base station $20_1$ and the mobile station $10_1$ to transfer data between them.

To be more precise, in the mobile station $10_1$, the first switch (SW1) 41 is switched alternately between the transmitter A (37) and the receiver A (39), and the second switch (SW2) 42 is connected to the receiver B (40), as illustrated in FIG. 12B. No serial to parallel conversion is carried out by S/P converter 35, and all the signals from the signal processing unit 33 are supplied to the transmitter A (37). Parallel to serial conversion is carried out by P/S converter 36 so that the signal ratio of the receiver A (39) to the receiver B (40) becomes 1 to 2 (1:2).

In the base station $10_1$, the first switch (SW1) 58 is switched alternately between the receiver A (56) and the transmitter A (51), and the second switch (SW2) 59 is connected to the transmitter B (52). Serial to parallel conversion is carried out by S/P converter 55 so that the signal ratio of the transmitter A (51) to transmitter B (52) becomes 1 to 2 (1:2). No parallel to serial conversion is carried out by P/S converter 54, and the all the signals from the receiver A (56) are supplied to the signal processing unit 50.

If the data volume on the uplink becomes greater than that on the downlink, the mode is changed to the FDD/TDD mixed mode B, as is illustrated in FIGS. 13A and 13B. In this mode, the downlink frequency $f_2$ is shared by the up channel and the down channel in the time division duplex (TDD) manner, as illustrated in FIG. 13A. The control signal generated by the signal processing unit 50 of the base station $10_1$ contains control commands for regulating the first switches (SW1) 58 and 41, the second switches (SW2) 59 and 42, the serial to parallel converters (S/P) 55 and 35, and the parallel to serial converters (P/S) 54 and 36, so that the base station $10_1$ transmits and the mobile station $20_1$ receives at frequency $f_1$, and that the downlink frequency $f_2$ is used alternately by the base station $20_1$ and the mobile station $10_1$ to transfer data between them.

To be more precise, in the mobile station $10_1$, the first switch (SW1) 41 is connected to the transmitter A (37), and the second switch (SW2) is switched alternately between the transmitter B (38) and the receiver B (40), as illustrated in FIG. 13B. Serial to parallel conversion is carried out by S/P converter 35 so that the signal ratio of the transmitter A (37) to transmitter B (38) becomes 2 to 1 (2:1). No parallel to serial conversion is carried out by P/S converter 36, and the all the signals from the receiver B (40) are supplied to the signal processing unit 33.

In the base station $10_1$, the first switch (SW1) 58 is connected to the receiver A (56), and the second switch (SW2) 59 is switched alternately between the receiver B (57) and the transmitter B (52). No serial to parallel conversion is carried out by S/P converter 55, and all the signals from the signal processing unit 50 are supplied to the transmitter B (52). Parallel to serial conversion is carried out by P/S converter 54 so that the signal ratio of the receiver A (39) to the receiver B (40) becomes 2 to 1 (2:1).

In this manner, the mobile communication system according to the embodiment changes the communication mode depending on the data volumes on the uplink and the downlink. With the substantially equal data volumes between the uplink and the downlink, radio frequencies $f_1$ and $f_2$ are used exclusively for the uplink and the downlink, respectively. With the uplink data volume increased over the downlink data volume, the downlink frequency $f_2$ is shared between the uplink and the downlink in the TDD manner. With the downlink data volume increased over the uplink data volume, then the uplink frequency $f_1$ is shared between the uplink and the downlink in the TDD manner, so that the up channel communication and the down channel communication are carried out alternately. With this arrangement, the radio resources are appropriately allocated to the links in accordance with the data volumes on the uplink and the downlink. As a result, the radio resources are utilized efficiently.

The mode switcher, which comprises the signal processing unit 50 of the base station $10_1$ and the switching controllers 53 and 34, also controls the time slot allocation ratio between the uplink and the downlink. In the example shown in FIG. 9B, the time slots of the uplink frequency $f_1$ are allocated to the uplink and the downlink alternately at the same ratio. However, this allocation rate may be adjusted in accordance with the data transfer volumes in the uplink and downlink. For example, the time slots may be allocated to the uplink and the downlink at a ratio of 1 to 2, so that the up channel uses frequency $f_1$ one of every three time slots. In this case, the signal processing unit 50 generates a control command that regulates the switchers, the transmitters, the receivers, the P/S converters, and the S/P converters so as to operate at an appropriate timing and ratio.

Although the explanation has been made using an example in which the three communication modes are used, only two of them may be used. For example, the FDD mode and the FDD/TDD mixed mode A are used and the radio communication may be switched between these two modes if the downlink generally has a heavy traffic. Alternatively, the FDD mode and the FDD/TDD mixed mode B are used if the uplink traffic is generally heavy.

Next, the mode switching technique will be explained in more detail below. The mode change described above may be implemented in cooperation with any one or any combination of the means described below.

(1) Remote Monitoring Controller

Figure 14:
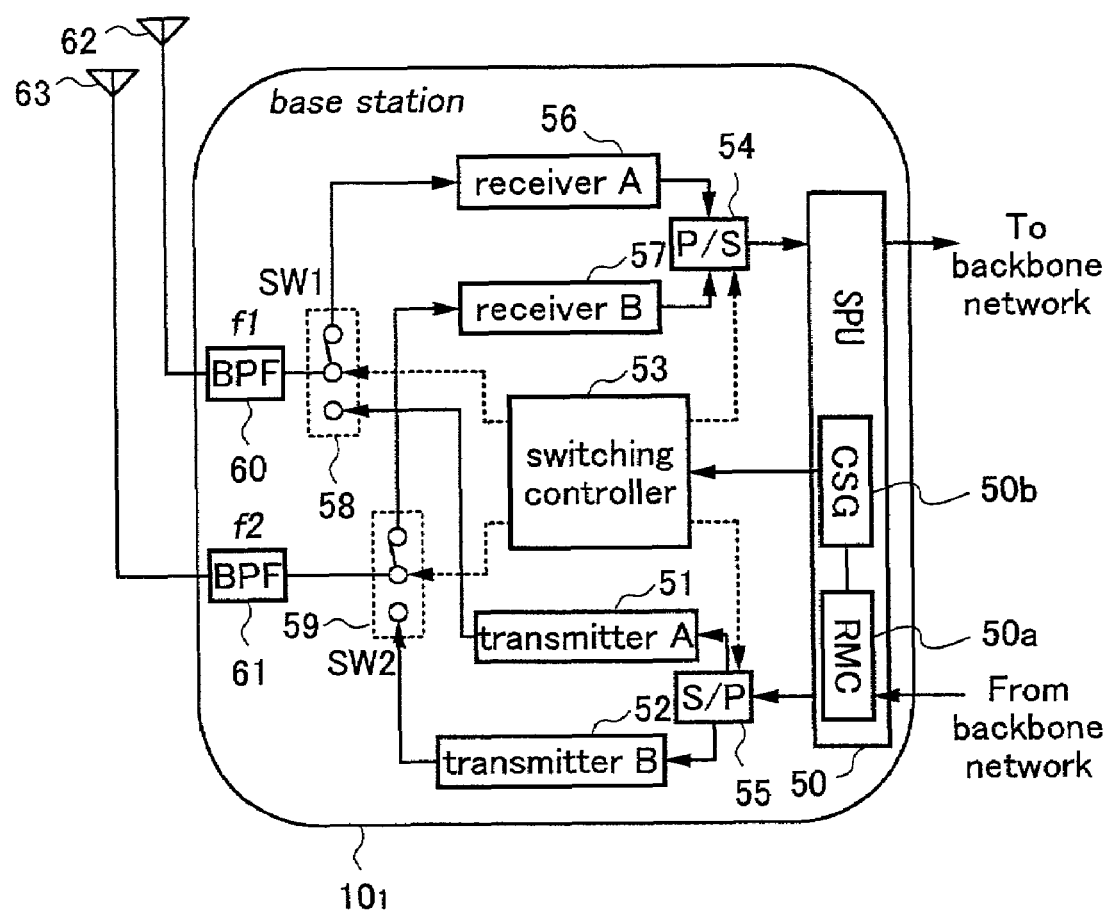
FIG. 14 illustrates an example of the base station used in the mobile communication system according to the embodiment.

FIG. 14 illustrates a modification of the base station $10_1$, which carries out mode switching. The signal processing unit 50 includes a remote monitoring controller (RMC) 50a and a control signal generator (CSG) 50b. The remote monitoring controller 50a receives via the backbone network a monitoring control signal from, for example, a monitoring station that monitors the data transfer volumes on the uplink and the downlink. The remote monitoring controller 50a selects an appropriate mode from the FDD mode, FDD/TDD mixed mode A, and FDD/TDD mixed mode B illustrated in FIGS. 11-13, based on the received monitoring signal.

The selected mode is supplied to the control signal generator 50b. The control signal generator 50b generates a control signal based on the selected mode. The control signal is supplied to the switching controller 53, which then switches the first and second switches (SW1 and SW2) 58 and 59, and controls the operations of the P/S converter 54 and the S/P converter 55, in an appropriate manner. This control signal is supplied to the switching controller 34 of the mobile station $20_1$ on the downlink, and it causes the switching controller 34 to control the connections of the switches (SW1 and SW2) 41 and 42 and the operations of the S/P converter 35 and the P/S converter 36.

(2) Time Management Controller

Figure 15:
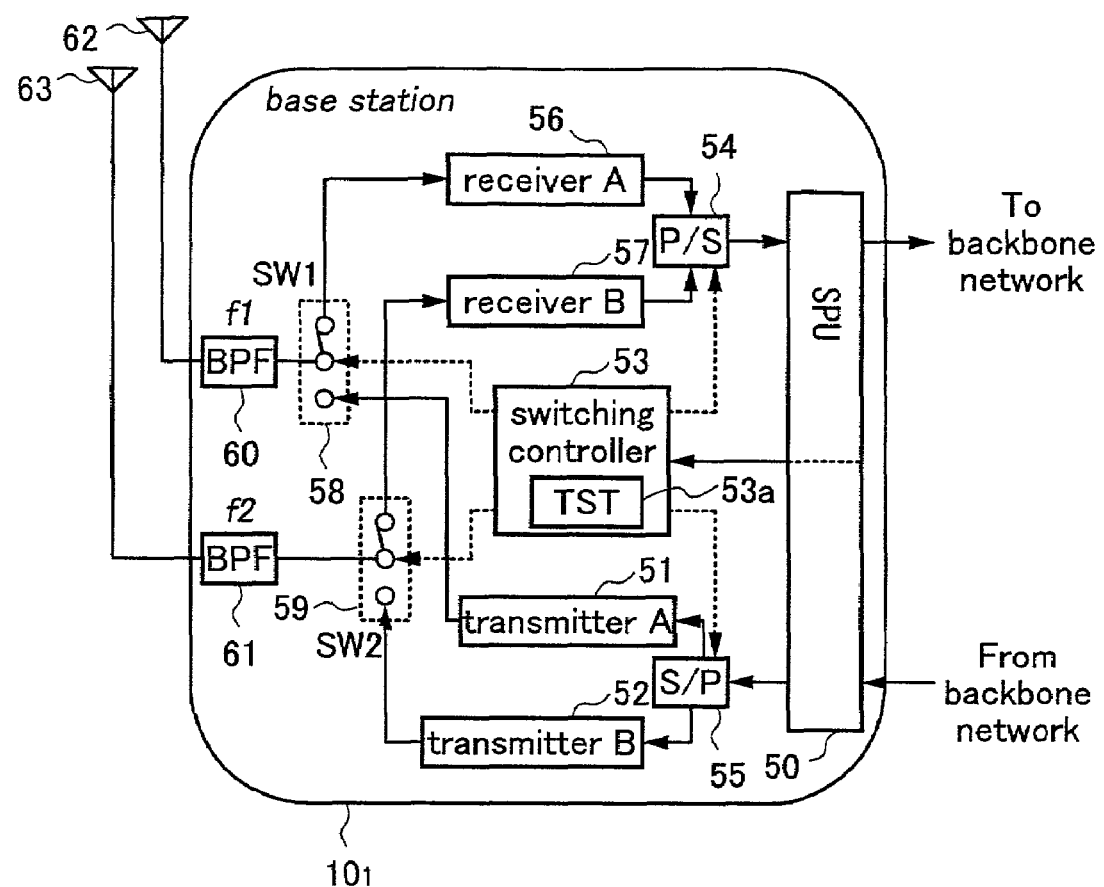
FIG. 15 illustrates a modification of the base station.

FIG. 15 illustrates another modification of the base station $10_1$. The switching controller 53 has a time schedule table (TST) 53a. In this modification, the switching controller 53 functions also as a time management controller. For example, the monitoring station takes statistics of the time-varying data volumes on the uplink and the downlink, and makes up a time schedule of a day or a week for mode change in advance, based on the statistics result. The time schedule is incorporated in the switching controller 53. The switching controller 53 controls the connections of the switches (SW1 and SW2) 58 and 59 and the operations of the P/S converter 54 and the s/P converter 55. Although not illustrated in FIG. 15, a corresponding time schedule (i.e., a time schedule table) is also incorporated in the switching controller 34 of the mobile station $20_1$. Thus, the communication mode of the mobile communication system is automatically switched in accordance with the prescribed time schedule.

(3) Communication Observation Controller

Figure 16:
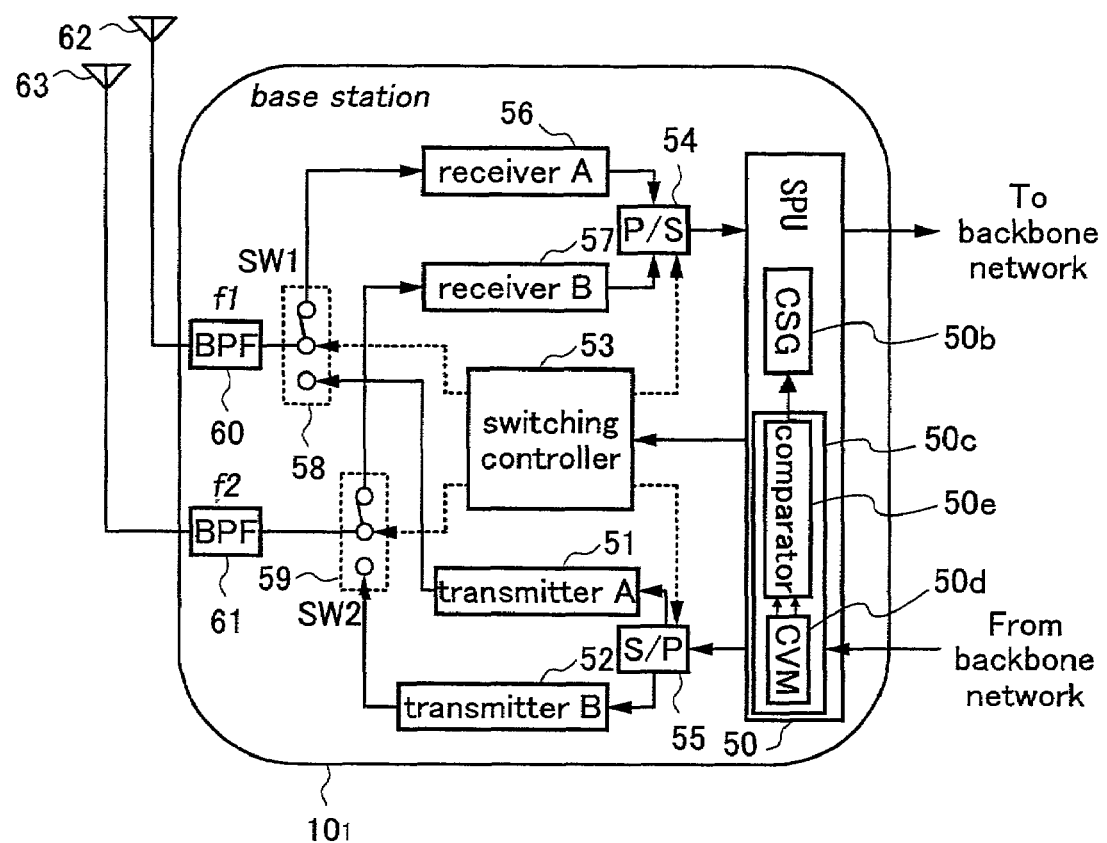
FIG. 16 illustrates another modification of the base station.

FIG. 16 illustrates still another modification of the base station $10_1$. The signal processing unit 50 has a control signal generator (CSG) 50b and a communication observation controller 50c. The communication observation controller 50c includes a communication volume monitoring (CVM) unit 50d for measuring the communication volumes on the uplink and the downlink, and a comparator 50e for comparing the measurements of the uplink and the downlink. The comparison result is supplied to the control signal generator (CSG) 50b, which generates a control signal for causing the switching controller 53 to appropriately switch the connection states of the switches (SW1 and SW2) 58 and 59 and the operations of the P/S converter 54 and the S/P converter 55. Although not illustrated in FIG. 16, the control signal is supplied to the switching controller 34 of the mobile station $20_1$, and the switches 41 and 42, the S/P converter 35, and the P/S converter 36 are appropriately controlled. With this arrangement, mode control centralizes in each of the base stations $10_1$-$10_3$ (FIG. 8), using the measuring results obtained at the base station.

The mode switch operations may be carried out independently among the base stations $10_1$-$10_3$, or alternatively, all of or some neighborhood base stations may change the communication mode in synchronization with each other in order to prevent interference in carrier propagation. In the latter case, the transmitters 51, 52 and the receivers 56, 57 of the base station $10_1$, and the receivers 39, 40 and the transmitters 37, 38 of the mobile station $20_1$ synchronize with each other. In addition, if the FDD/TDD mixed mode A or B is selected, the up channel communication and the down channel communication may be switched using the same frequency after the base stations of all of or some neighborhood cells are synchronized with each other.

The mode switcher of the mobile communication system is not limited to the above-described examples. For example, a system manager that monitors and manages the mobile communication system may manually switch the communication mode of the system.

Figure 17:
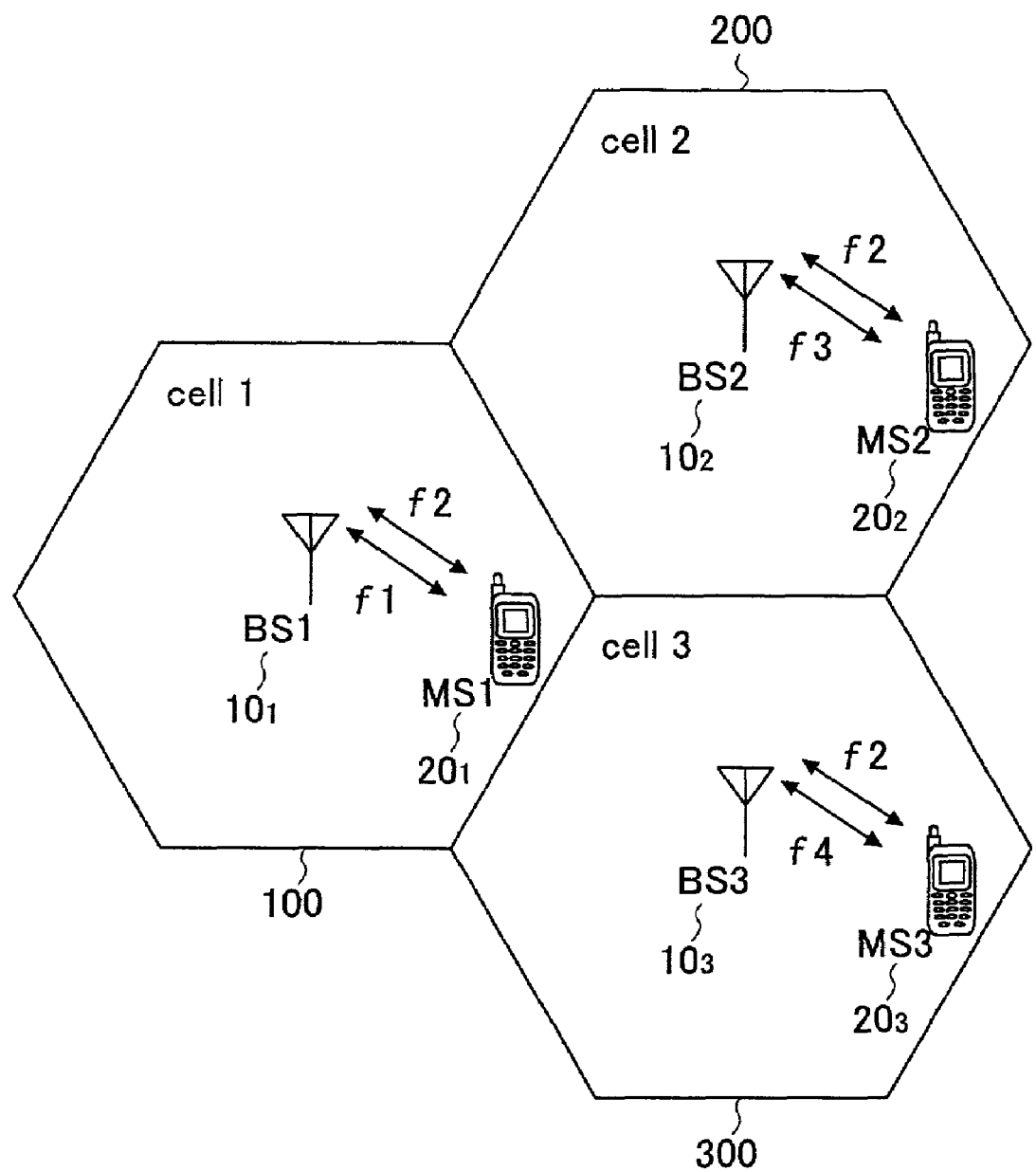
FIG. 17 illustrates another example of the cell structure of the mobile communication system according to the invention.

FIG. 17 illustrates another example of the cell structure. In this frame structure, adjacent cells use different combinations of radio frequencies. For example, cell 100 uses frequencies $f_1$ and $f_2$, the adjacent cell 200 uses frequencies $f_2$ and $f_3$, and another adjacent cell 300 uses frequencies $f_2$ are $f_4$. This arrangement can effectively prevent interference, which may occur in the cell structure shown in FIG. 8, in which the same frequencies $f_1$ and $f_2$ are used in all the cells. With the cell structure of FIG. 8, if the downlink data volume becomes greater than the uplink data volume, and therefore, uplink frequency $f_1$ is used in the TDD manner, then, the base station may receive radio frequency $f_1$ from the adjacent cell, which causes undesirable interference. By allocating different frequencies to the adjacent cells, as illustrated in FIG. 17, signal interference can be prevented effectively in the mobile communication system.

Preferably, the switching timing of the switches 41, 42, 58, 59 of the mobile station $10_1$ and the base station 201, and the signal ratio defined by the serial to parallel converters 35, 55 and the parallel to serial converters 36, 54 are adjusted more finely. This arrangement allows the system to cover possible contingencies in the asymmetric data communication between the uplink and the downlink, and consequently, the resource utilization efficiency can be further improved.

Basically, the mobile communication system described in the embodiment operates in the FDD manner, and uses the TDD method as required depending on the data transfer volumes on the uplink and the downlink. Consequently, the mobile communication system does not require the clock rate and the modulation rate to be extremely increased, unlike in the conventional asymmetric TDD system, and the system structure, including the signal processing units and the transmitters/receivers of the base station and the mobile station, can be simplified.

Although the invention has been described using specific examples, the present invention is not limited to those examples, but includes many substitutions and modifications without departing from the scope of the invention. For example, although in the embodiment three communication modes are used, two of these modes (for example, the FDD mode and the FDD/TDD mixed mode A, or the FDD mode and the FDD/TDD mixed mode B) may be used. In this case, the mode switcher switches the system operation between the selected two modes.

This patent application is based on and claims the benefit of the earlier filing date of Japanese patent application No. 2001-146852 filed May 16, 2001, the entire contents of which are hereby incorporated by reference.

What is claimed is:

1. A mobile communication system including a base station and a mobile station configured to communicate with the base station, the system including:
    a first communication mode between the base station and the mobile station in which a first radio frequency is used for an uplink and a second radio frequency is used for a downlink;
    a second communication mode between the base station and the mobile station in which the first radio frequency is used for the uplink, and the second radio frequency is shared by the uplink and the downlink;
    a third communication mode between the base station and the mobile station in which the first radio frequency is shared by the uplink and the downlink and the second radio frequency is used for the downlink; and
    a mode switcher configured to switch a communication mode between the base station and the mobile station among the first, second, and third communication modes in accordance with data transfer volumes on the uplink and the downlink between the base station and the mobile station, while keeping the base station in synchronization with an adjacent base station so as to prevent interference.

2. The mobile communication system according to claim 1, wherein the base station includes a signal processing unit configured to receive a remote monitoring control signal supplied from a backbone network to which the base station is connected, and the mode switcher switches the communication modes based on the remote monitoring control signal.

3. The mobile communication system according to claim 1, wherein the mode switcher is configured to store a time schedule table for switching the communication modes, and switches the communication modes automatically based on the time schedule table, wherein the time schedule table is determined in advance based on statistics of time-varying data volumes on the uplink and the downlink.

4. The mobile communication system according to claim 1, wherein the base station includes a signal processing unit configured to measure and compare the data transfer volumes of the uplink and the downlink, and the mode switcher switches the communication modes based on the comparison result.

5. The mobile communication system according to claim 4, wherein the signal processing unit includes a communication volume monitoring unit configured to measure the data transfer volumes on the uplink and the downlink, and a comparator configured to compare the measuring results.

6. The mobile communication system according to claim 1, wherein either the first or the second frequency is shared by the uplink and the downlink at a predetermined allocation ratio of time slots, and the base station includes a signal processing unit configured to adjust the allocation ratio of the time slots.

7. The mobile communication system according to claim 1, further comprising:
- at least one cell, each cell including the base station, wherein the mode switcher switches the communication mode after at least two neighborhood base stations are synchronized with each other.

8. The mobile communication system according to claim 1, further comprising:
- at least one cell, each cell including the base station, wherein uplink communication and downlink communication are switched at either the first or the second frequency at a predetermined time interval after at least two neighborhood base stations are synchronized with each other.

9. The mobile communication system according to claim 1, wherein in the second communication mode, a concurrent time slot of the first and second radio frequency is either used only by the uplink or by the uplink and the downlink.

* * * * *